(12) United States Patent
Wagner et al.

(10) Patent No.: US 8,787,190 B2
(45) Date of Patent: Jul. 22, 2014

(54) METHOD, SYSTEM, NETWORK NODES, ROUTERS AND PROGRAM FOR BANDWIDTH ESTIMATION IN MULTI-HOP NETWORKS

(75) Inventors: Stuart Wagner, Milford, NJ (US); James Giacopelli, Hillsborough, NJ (US)

(73) Assignee: TT Government Solutions, Inc., Basking Ridge, NJ (US)

( * ) Notice: Subject to any disclaimer, the term of this patent is extended or adjusted under 35 U.S.C. 154(b) by 435 days.

(21) Appl. No.: 13/287,376

(22) Filed: Nov. 2, 2011

(65) Prior Publication Data

US 2013/0107729 A1   May 2, 2013

(51) Int. Cl.
*H04W 24/00* (2009.01)
(52) U.S. Cl.
USPC .......................... 370/252; 370/255; 370/516
(58) Field of Classification Search
CPC ... H04W 24/00; H04L 43/50; H04L 43/0852; H04L 43/08; H04B 17/003
USPC ................. 370/252, 253, 255, 516
See application file for complete search history.

(56) References Cited

U.S. PATENT DOCUMENTS

| 2005/0286426 | A1 | 12/2005 | Padhye et al. |
| 2008/0031187 | A1 | 2/2008 | Draves, Jr. et al. |
| 2009/0245133 | A1 | 10/2009 | Gupta et al. |
| 2010/0074273 | A1 | 3/2010 | Ji |

OTHER PUBLICATIONS

J. Strauss, D. Katabi, and F. Kaashoek, "A Measurement Study of Available Bandwidth Estimation Tools," The Internet Measurements Conference, Florida, 2003.
R. S. Prasad, et al., "Bandwidth Estimation: Metrics, Measurement Techiques, and Tools," IEEE Network, vol. 17, Issue 6, pp. 27-35, 2003.
H. Zhou, et al., "Difficulties in Estimating Available Bandwidth," Proc. IEEE International Conference on Communications, pp. 704-709, 2006.
International Application No. PCT/US2012/039923—PCT International Search Report dated Aug. 27, 2012.

*Primary Examiner* — Christopher Grey
(74) *Attorney, Agent, or Firm* — Heslin Rothenberg Farley & Mesiti P.C.

(57) ABSTRACT

A system, a network node, a router, a method and a program used to determine a bottleneck bandwidth on a multi-hop path between a source and destination node is presented. The method comprises receiving probe packets by a first hop node in the multi-hop path, measuring a bandwidth on a link between the first hop node and a next hop node in the multi-hop path, generating a bandwidth discovery packet including the measured bandwidth, transmitting the BDP to the next hop node, relaying the probe packets to the next hop node, and determining if the next hop node is a last-hop node on the multi-hop path. A last hop node records the measured bandwidth from the BDP, adjusts the delay between the probe packets based upon the bandwidth and relaying the probe packets to the destination node. The destination node determines the bottleneck bandwidth based on the delay between the probe packets.

24 Claims, 10 Drawing Sheets

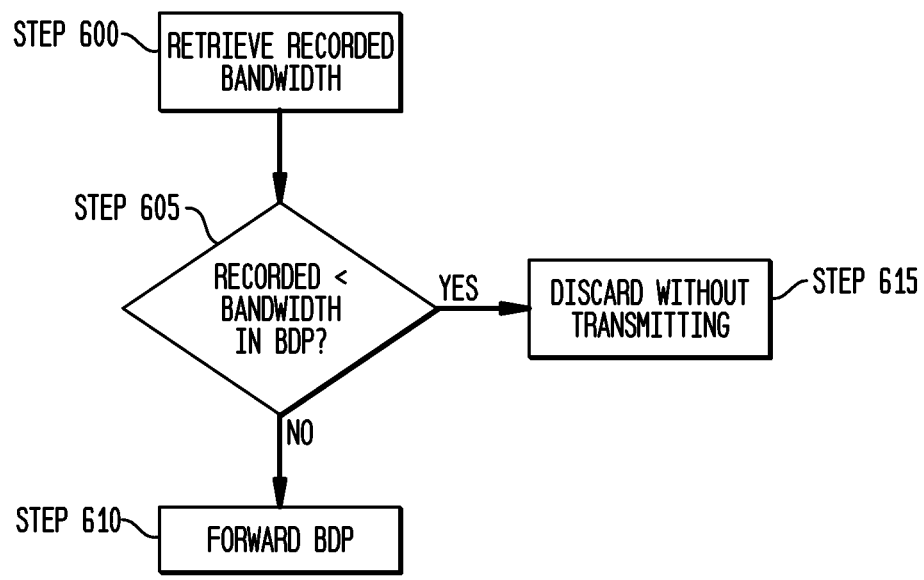
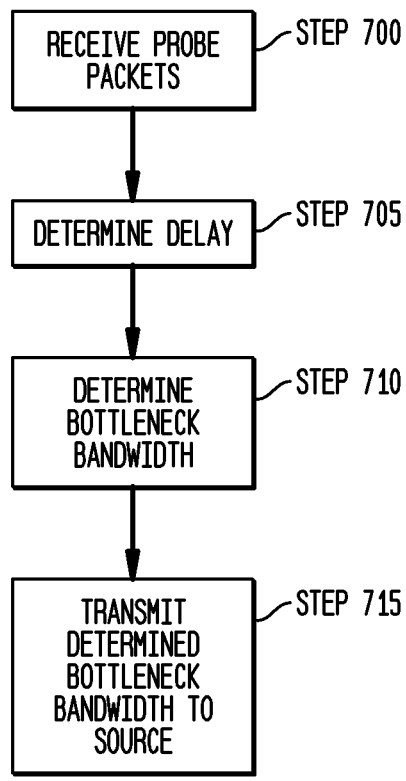

US 8,787,190 B2

METHOD, SYSTEM, NETWORK NODES, ROUTERS AND PROGRAM FOR BANDWIDTH ESTIMATION IN MULTI-HOP NETWORKS

FIELD OF THE INVENTION

This invention relates to communication networks and bandwidth estimation. More particularly, the invention relates to a method, nodes, a system, routers and a program for estimating a bottleneck bandwidth for links in a multi-hop path between a source and a destination node.

BACKGROUND

A bottleneck bandwidth is the lowest bandwidth of any link on a multi-hop path. This bandwidth poses a constraint on the path throughput. FIG. 1 illustrates a probe gap technique for estimating bandwidth on a directional path from the hosts 1 (Ra to Rb). Hosts 1 Ra and Rb are both fronted by encryption devices 5 (Ea and Eb). The encryption devices 5 are between a red (plaintext) and a black network (ciphertext) 3. The path between hosts 1 passes to a multi-hop path through m nodes 15 (N1, N2, Nm) in the black network 3. To estimate bandwidth, Ra sends one or more probe pairs 10, e.g., probe packets 1 and 2, back-to-back, to Rb. FIG. 1 illustrates an arrow in the forward direction to show the probe pair 10 being sent from Ra to Rb. These probe pairs propagate through the black network 3, with network conditions (including the link bandwidths on each hop, and congestion at each node) altering the gap between the probes 10. When the probe pairs 10 arrive at Rb, Rb infers a bandwidth estimate from the time gap between the packets in the probe pair 10, and sends the bandwidth estimate back to Ra via a separate message 20. The time gap in FIG. 1 is depicts as a space between probe packets 1 and 2. FIG. 1 illustrates an arrow in the reverse direction to show the bandwidth estimate being sent from Rb to Ra. Specifically, $B=L2/(T2-T1)$, where B is the bottleneck bandwidth, L2 is the length of the second probe in bits, and T1 and T2 are the arrival times of the first and second probes, respectively.

However, the probe gap is subject to effects of packet queuing and cross traffic, including packets from other flows being inserted between the probe pair 10. If non-probe packets are queued between two probes making up a probe pair 10, the probe gap will no longer reflect the true link bandwidth, but will reflect the combined time for transmitting the second probe as well as the interspersed packet(s). This problem will cause the probe gap technique to under-estimate the bandwidth. If the probes remain back-to back, but become queued at a point downstream from the bandwidth bottleneck, then the resulting probe gap will reflect the bandwidth at the queuing point, not the bottleneck bandwidth. This effect could lead to a substantial over-estimation of the bottleneck bandwidth.

The addition of encryption (red/black) boundaries at network edges makes the task of bandwidth estimation even more difficult for hosts on the red (plaintext) side of the encryption boundary, e.g., Ea and Eb. From the standpoint of red-side hosts 1, the boundary hides many details of black-network operation, and prevents direct exchange of network state information via flows between hosts Ra and Rb or nodes 15 on opposite sides of the boundary. As a result, even if nodes N1-Nm within the black network 3 could accurately measure network bandwidth, these nodes 15 would not be able to communicate this information across the boundary to hosts 1 on the red side.

SUMMARY OF THE INVENTION

Accordingly, disclosed is a method for determining a bottleneck bandwidth on a multi-hop path between a first and a second encrypted network endpoint. The method comprises receiving probe packets from a source node by a first hop node in the multi-hop path, measuring a bandwidth on a link between the first hop node and a next hop node in the multi-hop path, generating a bandwidth discovery packet including the measured bandwidth, transmitting the bandwidth discovery packet to the next hop node, relaying the probe packets to the next hop node and determining if the next hop node is a last-hop node on the multi-hop path based upon the routing protocol. If the next hop node is the last hop node, the method further comprises recording the measured bandwidth from the bandwidth discovery packet, adjusting the delay between the probe packets based upon the measured bandwidth from the bandwidth discovery packet; and relaying the probe packets to the destination node.

The destination node determines the bottleneck bandwidth based on the delay between the probe packets. The destination node sends the determined bottleneck bandwidth to the source node.

Each node that is not the first or the last hop node, measures a bandwidth on a link between the node and its next hop node along the multi-hop path that is its next hop node, compares the measured bandwidth on the link between the node and its next hop node with the measured bandwidth from the bandwidth discovery packet, modifies the measured bandwidth from the bandwidth discovery packet based upon the comparing, transmits the bandwidth discovery packet to its next hop node, relaying the probe packets and records either the modified the measured bandwidth from the bandwidth discovery packet or an unmodified measured bandwidth from the bandwidth discovery packet as a recorded bandwidth.

After transmitting the bandwidth discovery packet for the multi-hop path, each node (other than the last hop node) measures a current bandwidth on the link between a node measuring the bandwidth and its next hop node, compares the measured current bandwidth with the recorded bandwidth, generating new bandwidth discovery packet including the current bandwidth as a bandwidth in the new bandwidth discovery packet if a difference between the current bandwidth and the recorded bandwidth is greater than a predetermined threshold and transmits the new bandwidth discovery packet to its next hop node. If the node that measured the bandwidth is not the first hop node in the multi-hop path, a flag is not set, the flag indicating that the first hop node generated the bandwidth discovery packet. The new bandwidth discovery packet is relayed to the last hop node using nodes in the multi-hop path.

When the next hop node receives the new bandwidth discovery packet, the next hop node compares the recorded value with the bandwidth in the new bandwidth discovery packet and relays the new bandwidth discovery packet based upon the comparison.

Also disclosed is a router comprising a storage device configured to store a computer program, a communication section and a processor for executing the computer program stored in the storage device.

When the router receives probe packets from a node whose address is the same as a source address in the probe packets, the probe packets having a destination of a destination node, the processor is configured to measure a bandwidth on a link between the router and another router which is a next hop router in a multi-hop path to the destination node, generate a bandwidth discovery packet including the measured bandwidth, and transmit the bandwidth discovery packet to the next hop router and relaying the probe packets to the next hop router.

When router receives probe packets from another router and the bandwidth discovery packet, the processor is configured to determine if the router is a last-hop router on the multi-hop path to the destination node based upon the routing protocol. If the router is not the last-hop router, the processor is configured measure a bandwidth on a link between the router and another router which is a next hop router in the multi-hop path to the destination node, compare the measured bandwidth on the link between the router and the next hop router with the measured bandwidth from the bandwidth discovery packet, modify the measured bandwidth from the bandwidth discovery packet based upon the comparing, transmit the bandwidth discovery packet to the next hop router, relay the probe packets and record either the modified the measured bandwidth from the bandwidth discovery packet or an unmodified measured bandwidth from the bandwidth discovery packet as a recorded bandwidth.

If the router is the last-hop router, the processor is configured to record the measured bandwidth from the bandwidth discovery packet in the storage device, adjust the delay between the probe packets based upon the measured bandwidth from the bandwidth discovery packet and relay the probe packets to the destination node.

The processor is also configured to periodically measure a current bandwidth on the link between the router and another router which is the next hop router, compare the measured current bandwidth with the recorded bandwidth in the storage device, generate a new bandwidth discovery packet including the current bandwidth as a bandwidth in the new bandwidth discovery packet if a difference between the current bandwidth and the recorded bandwidth is greater than a predetermined threshold. If the router is not a first hop router in the multi-hop, the processor is configured not to set a flag, the flag indicating that the first hop router generated the bandwidth discovery packet and the processor is further configured to transmit the new bandwidth discovery packet to a next hop router.

The processor is also configured to compare the recorded value with the bandwidth in the new bandwidth discovery packet and relay the new bandwidth discovery packet based upon the comparison.

Also disclosed is a method for determining a bottleneck bandwidth on a multi-hop path between a first and a second encrypted network endpoint. The method comprises receiving a first set of probe packets from a first host node by a last hop node in the multi-hop path, the first set of probe packets being relayed via the multi-hop path to the last hop node, receiving a second set of probe packets from a second host node by the last hop node, generating a bandwidth discovery packet including a maximum recordable bandwidth at a last hop node in a multi-hop path between the first and the second encrypted network endpoints, transmitting the bandwidth discovery packet to previous hop node, relaying the second set of probe packets to the previous hop node, and determining if the previous hop node is a first hop node on the multi-hop path based upon the routing protocol. If the previous hop node is the first hop node, the method further comprises recording the bandwidth from the bandwidth discovery packet; adjusting the delay between probe packets in the second set of probe packets based upon the bandwidth from the bandwidth discovery packet; and relaying the second set of probe packets to the first encrypted network endpoint. The first encrypted network endpoint transmits the second set of probe packets to the first host node. The previous hop node is a node within the multi-hop path that directly transmitted the first set of probe packets to the last hop node. The first and the second set of probe packets being encrypted by the first and the second encrypted network endpoints, respectively.

The first host node determines the bottleneck bandwidth based upon the delay between probe packets in the second set of probe packets.

Each node in the multi-hop path that is not the first or last hop node, measures a bandwidth on a link between the node and its next hop node in a forward direction on the multi-hop path between the first and second encrypted network endpoints, compares the measured bandwidth on the link with the bandwidth from the bandwidth discovery packet, modifies the bandwidth from the bandwidth discovery packet based upon the comparing, transmits the bandwidth discovery packet to its previous hop node, relays the second set of probe packets to its previous hop node; and records either the modified the bandwidth from the bandwidth discovery packet or an unmodified bandwidth from the bandwidth discovery packet as a recorded bandwidth. The previous hop node is a node which relayed the first set of probe packets to the node.

After transmitting the bandwidth discovery packet for the multi-hop path, the method further comprises measuring a current bandwidth on the link between a node measuring the bandwidth and its next hop node in a forward direction on the multi-hop path between the first and second encrypted network endpoints, comparing the measured current bandwidth with the recorded bandwidth, generating new bandwidth discovery packet including the current bandwidth as a bandwidth in the new bandwidth discovery packet if a difference between the current bandwidth and the recorded bandwidth is greater than a predetermined threshold, and transmitting the new bandwidth discovery packet to a node which relayed the first set of probe packets to the node measuring the bandwidth. The new bandwidth discovery packet is relayed to the first hop node using nodes in the multi-path between the first and second encrypted network endpoints.

If the node that measured the bandwidth is not the last hop node in the multi-hop, a flag is not set, the flag indicating that the last hop node generated the bandwidth discovery packet.

BRIEF DESCRIPTION OF THE DRAWINGS

These and other features, benefits, and advantages of the present invention will become apparent by reference to the following figures, with like reference numbers referring to like structures across the views, wherein:

FIGS. 3A-5 illustrate flow charts for an exemplary method of estimating the bottleneck bandwidth for a specific multi-hop path from Ra to Rb in accordance with the invention

DETAILED DESCRIPTION OF THE INVENTION

A "Node" is a router that implements the methods as specified in the following description.

A "Link" is a communication path between directly connected neighboring nodes.

A "Hop" is a communication of a packet over a link between directly connected nodes "Multi-hop" is a relaying or forwarding of a packet over multiple successive links.

A "Red Network" is an unsecure network.

A "Black Network" is a secured network. Endpoints of the black network (red/black boundary points) are encryption and decryption devices.

Figure 1:
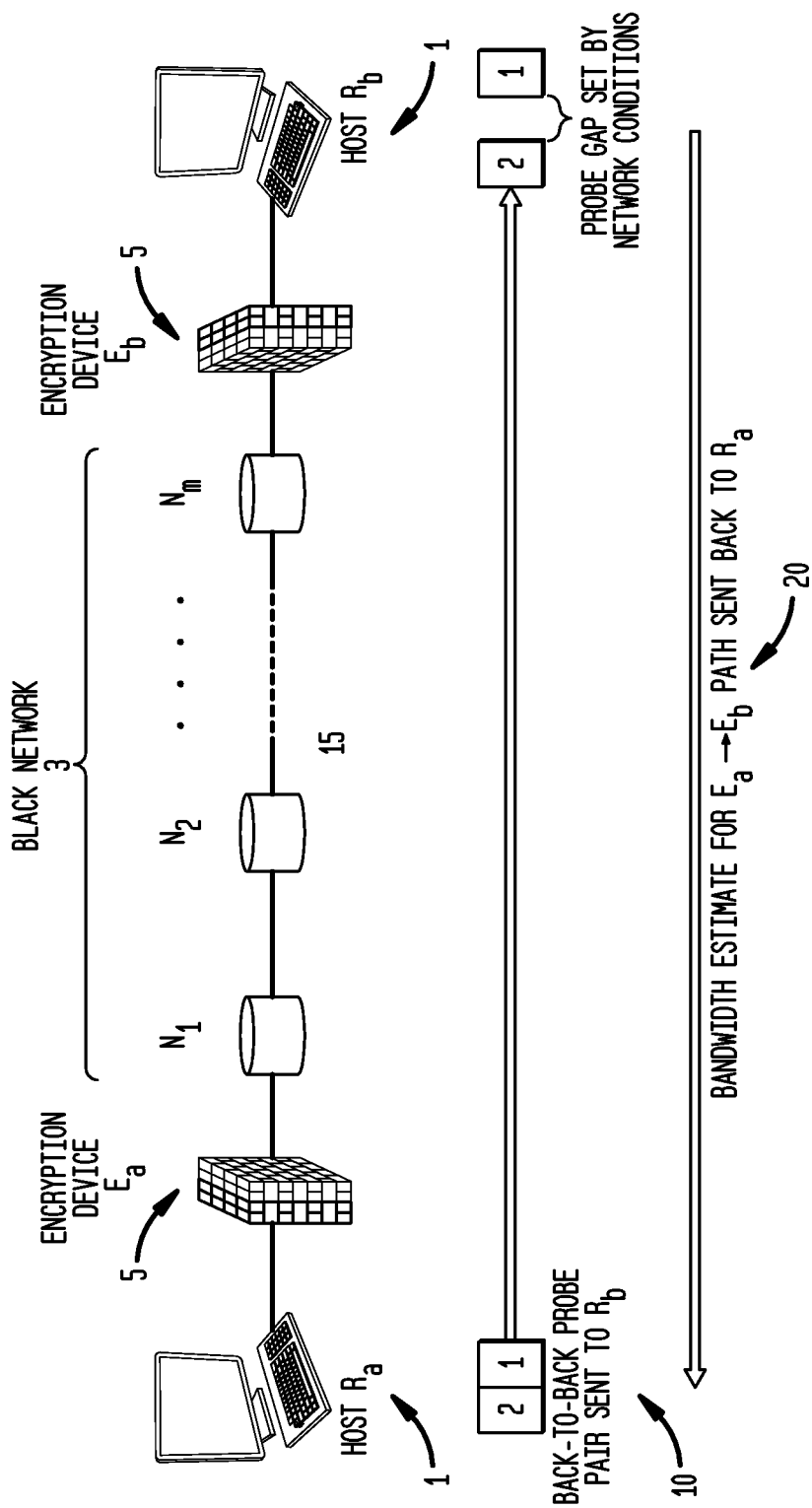
FIG. 1 illustrates a conventional system and method for estimating bandwidth.
Figure 2:
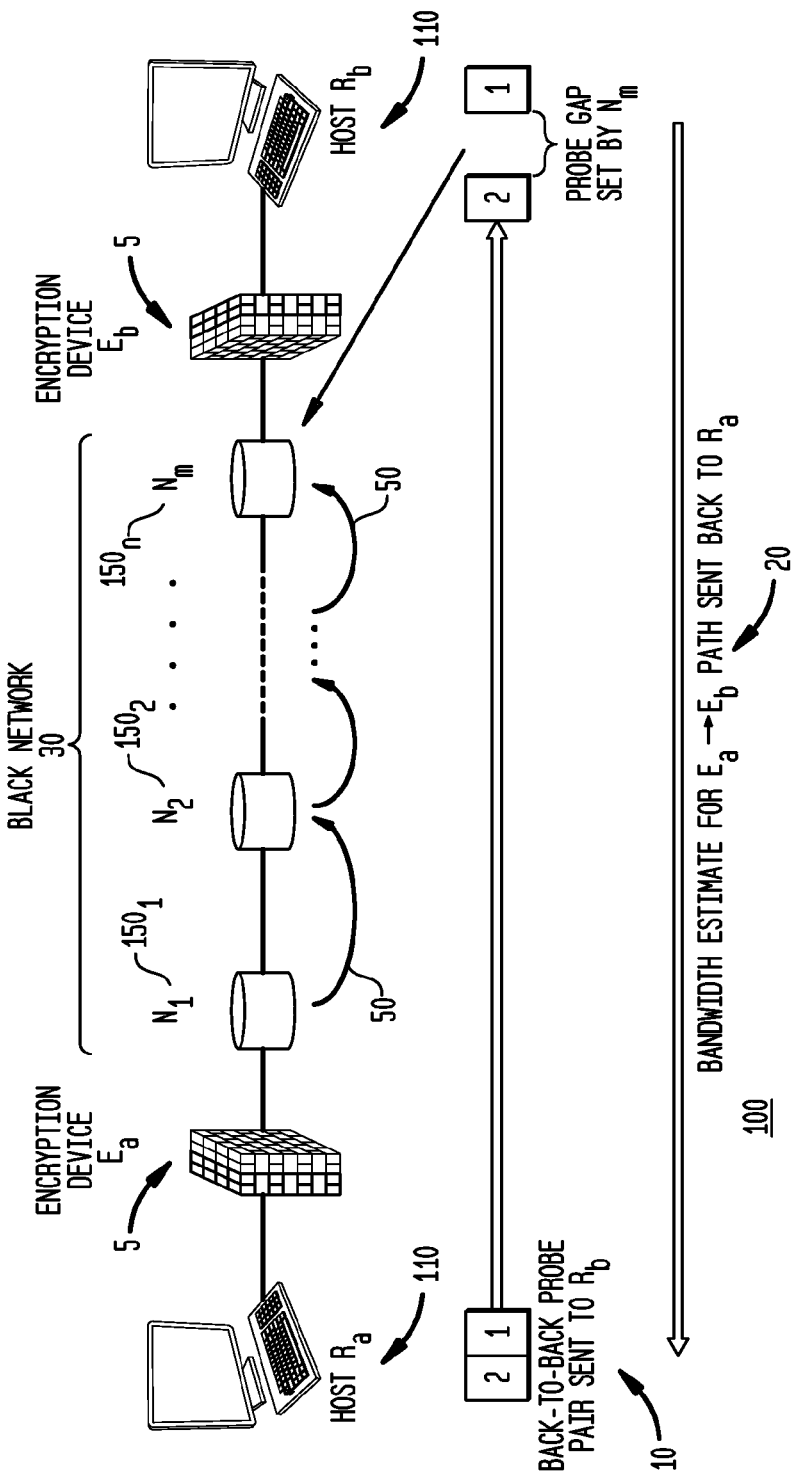
FIG. 2 illustrates a diagram of an exemplary system for estimating a bottleneck bandwidth in accordance with the invention.

FIG. 2 illustrates a system 100 for estimating a bottleneck bandwidth in accordance with the invention. The system 100 uses both probe pairs 10 and bandwidth discovery packets 50 ("BDPs") to estimate the bottleneck bandwidth. The BDP 50 tracks the bandwidth hop-by-hop. The BDPs are relayed to a last hop node within a specific multi-hop path. The last hop node adjusts the probe gap between the packets in the probe pair 10 using the BDP 50 before the probe pair 10 is relayed across the encryption boundary, i.e., relayed through the encryption devices 5.

The system 100 includes two hosts 1, Ra and Rb. For purposes of the description the hosts 110 will be individually referenced as "Ra" or "Rb" or collectively as "hosts" 110. The hosts 110 communicate with the black network 30 via encryption devices, Ea and Eb, respectively. For purposes of the description the encryption devices will be individually referenced as "Ea" or "Eb" or collectively as "encryption devices" 5. IPSec gateways and HAIPE in-line network encryptions can be used as the encryption devices 5. The packets are encapsulated with a new header. Packets that cross the red/black boundary appears as if the packet is sourced by Ea and destined for Eb in one direction and vice versa.

The black network 30 includes a plurality of nodes 150. Each node 150 is configured to perform the functionality described herein. For example, a node 150 includes a processor, a communication section, a power source, a storage device (e.g., a computer readable storage medium). The storage device contains a program of instructions that enables the processor to perform the functionality described herein.

Figure 3A:
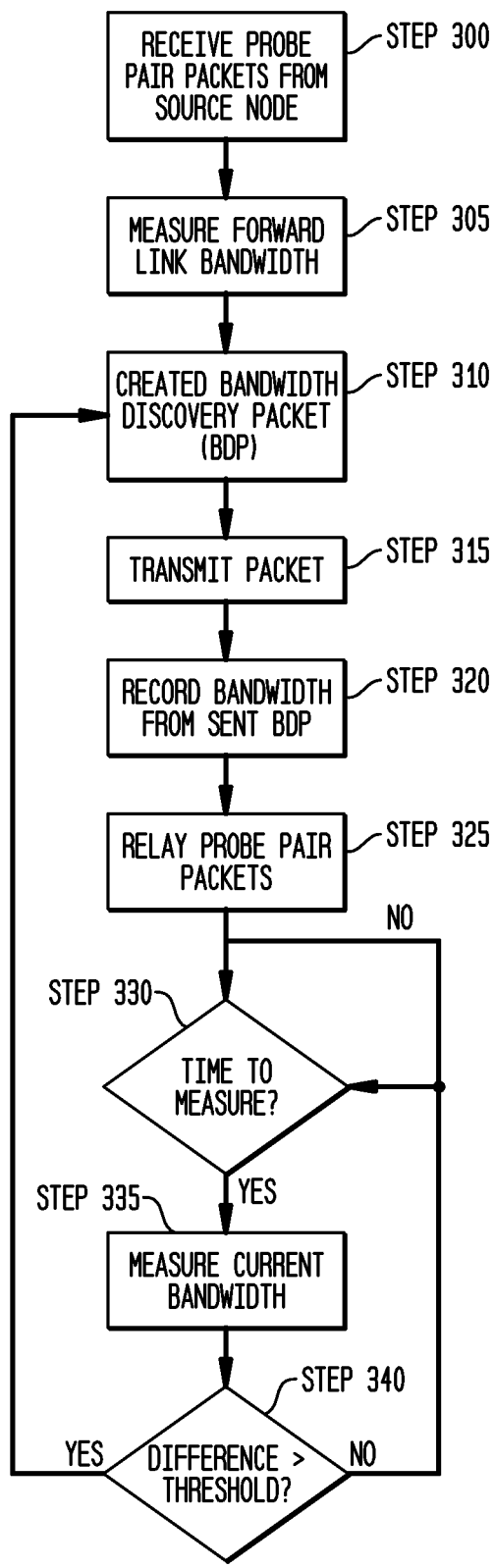

FIGS. 3A-5 illustrates flow charts for an exemplary method of estimating the bottleneck bandwidth for a specific multi-hop path from Ra to Rb in accordance with the invention. FIG. 3A illustrates the functionality of a "first hop node". FIG. 3B illustrates the functionality of intermediary hop nodes and a "last hop node". A first hop node is a node that directly receives a probe pair 10 from the source. The source is either the host Ra or the encryption device Ea (as noted earlier, when a packet crosses the red/black boundary, the packet appears to nodes inside the black network as being sourced by the Ea). A last hop node is a node that has a direct connection (link) with the destination. The destination is either the host Rb or Eb (when the packet is transmitted across the black/red boundary the destination appears as Eb). For a specific probe pair 10, the host 110 identifies the source and destination. Since, as depicted in FIG. 2, there are both red and black networks, the source does not specify the path.

Nodes 150 that relay the probe pair 10 to the destination, e.g. Eb (from Ea) are selected by the black network 30 according to the routing protocol for the network, e.g., black network 30. The routing protocol will not be described herein. The routing protocol is network specific. The routing protocol will determine the first hop node, intermediary hop nodes and last hop node based upon the shortest path or lowest cost path. Alternatively, the protocol can use quality of service parameters, such as, but not limited to, bandwidth, throughput, packet loss, priority, bit rate, shortest path. Routing can be static or dynamic. The routing information can be periodically updated. Each node maintains a list of neighbors and link states.

At step 300, the first hop node, e.g., N1 (hereinafter referenced as "N1"), receives the probe pair 10. Since it is the first hop node, the probe pair 10 is directly received from the "source". N1 can identify the probe packet (probe pair 10) based upon the source and destination, e.g., Ea and Eb. When a probe pair 10 sent from Ra to Rb traverses the black network 30, the packet's source address is the black-side address of Ea, and the packet's destination address is the black-side address of Eb. N1 identifies the probes pair's black-side destination. The receipt of the probe pair 10 triggers N1 to measure the forward bandwidth between itself and a next hop node to the destination. Since N1 is aware of the probe pair's black-side destination (or the actual destination in the case of no black network), N1 selects the next hop node based upon the routing protocol, i.e., next hop node towards the destination. For example, N1 can examine a local routing table.

At step 305, N1 measures the forward bandwidth. The bandwidth can be total capacity or available bandwidth or any bandwidth parameter that is indicative of a load. Bandwidth estimation of a single link is well known and will not be described herein in detail.

At step 310, N1 creates a BDP 50 addressed to Eb.

The BDP 50 has a payload that contains the addresses of the originating and terminating endpoints, e.g., Ea and Eb, on the multi-hop path whose bandwidth is to be measured (or actual endpoints Ra and Rb), the address, or other unique identifier, of the node creating the BDP 50 (e.g., N1), a flag to indicate whether the node creating the packet is the first hop node on the multi-hop path (which is true in this case) and the bandwidth that the node has measured on the link from itself to the next hop (e.g., N2). At step 315, N1 sends the BDP 50 out on the multi-hop path to the destination. The BDP 50 is sent using the routing protocol for the black network 30. N1 also records the measured bandwidth value in its storage device for later use at step 320. Additionally, N1 notes in the storage device that it has already sent a BDP 50. Additionally, N1 relays the probe pair 10 in the forward direction towards the destination, e.g., Eb (or Rb), step 325. The probe pair 10 is relayed using the routing protocol for the black network 30.

N1 can also periodically monitor the bandwidth after transmitting the BDP 50 for the specific multi-hop path. The period can be adjusted based upon a schedule, total load on the network, etc. The period is tracked using a clock. The clock can be internal to the processor. Alternatively, an external timer can be used. At decision step 330, N1 determines if it is time to measure the forward link bandwidth. If not, ("N" at step 330), N1 remains in standby. For purposes of the description, standby refers to not performing the described functionality for the specific probe pair 10 which triggered the process, however, the nodes 150 can be performing other network functions or processing other probe pairs for a different multi-hop path. If it is time ("Y" at step 330), N1 measures the forward link bandwidth at step 335 in a similar manner as step 305. If the bandwidth changed in a way that would have changed the value of the bandwidth in the BDP 50, it will generate a new BDP. At decision step 340, N1 determines if the difference between the current measured bandwidth and the previous recorded bandwidth (the recorded bandwidth equals the bandwidth in the previous BDP) is greater than a predetermined threshold. If the comparison indicates that the bandwidth did not significantly change, i.e., difference less than threshold, then it would not have changed the value in the BDP 50, thus N1 returns to standby, e.g., process returns to step 330. If the comparison indicates that the bandwidth significantly changed, N1 creates a new BDP 50, e.g., the process returns to step 310. BDP 50 includes the current bandwidth. The remaining items in the payload are the same. The new BDP 50 is sent to the next hop, e.g., N2, on the Ea→Eb multi-hop path as opposed to the destination Eb as with step 315.

Figure 3B:
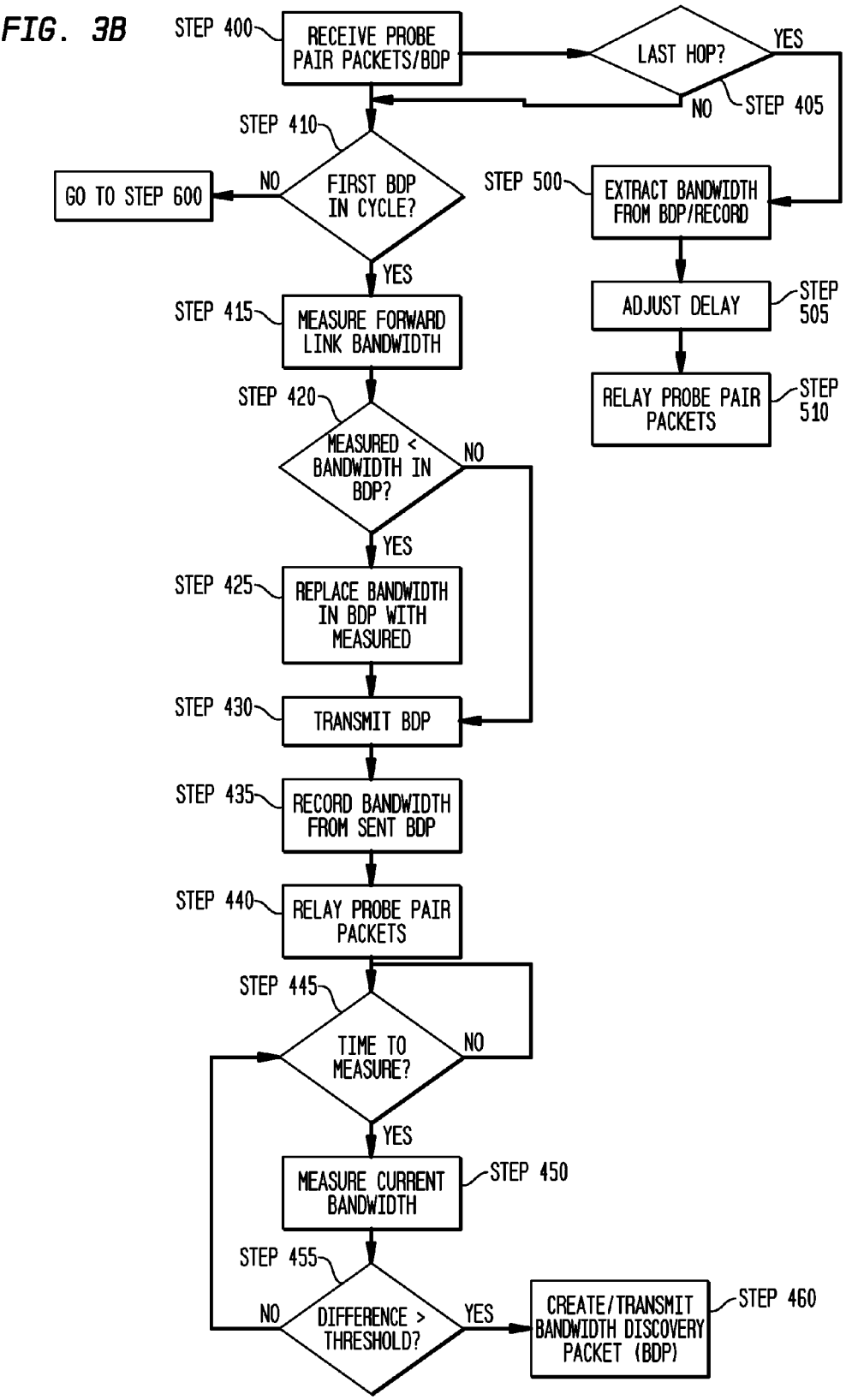

Each node 150 that subsequently receives the BDP 50 on the multi-hop path to Eb handles the packet according to the method illustrated in FIG. 3B.

At step 400, the node receives the BDP 50 and probe pairs 10. Although FIG. 3B illustrates that the node receives the BDP 50 and probe pairs 10 at the same time, the BDP 50 and the probe pairs 10 can be received at different times and also at different stages of the method. For example, the probe pairs 10 can be received after the node finishes processing the BDP 50.

When a node receives the BDP 50, it determines if it is the last hop node, e.g., Nm, at decision step 405. A last hop node handles the BDP 50 differently than intermediary hop nodes.

If the node is not the last hop node on the specific multi-hop path to Eb (i.e., if Eb is not directly reachable from the receiving node), the node (intermediary hop node) determines if the BDP 50 is the first BDP for the cycle at decision step 410. The node, e.g., N2, determines if the node has already processed a BDP 50 for the specific multi-hop path. This determination is based upon both the flag in the BDP 50 and if an indication has been stored in the storage section. If the BDP 50 was not created by the first hop node (N1) the flag is not set. If the flag is not set, the node, e.g., N2 will proceed to step 600. Additionally, if the node was already processed a BDP 50 for this cycle ("N" at step 410) the node will proceed to step 600. Probe pairs 10 are periodically sent for the same multi-path. The cycle refers to the same probe packet that triggered the first hop node (N1) to send the BDP 50. Optionally, the BDP 50 can include a cycle count or a timestamp. The cycle can be determined directly from the cycle count. Additionally, the cycle can be deduced by the current time and the time stamp. If the current time exceeds a predetermined time from the time stamp, the node can deduce that it is a new BDP 50.

If the intermediary hop node has not processed a BDP 50 for the specified multi-hop path, the intermediary hop node(s), e.g., N2-Nm−1, measures the current forward link bandwidth at step 415 and compare(s) the bandwidth value in the BDP 50 with the bandwidth that it has measured from itself to its next hop. At decision step 420, the measured current forward link bandwidth is compared with the bandwidth from the BDP 50. If the former value is lower than the latter ("Y" at step 420), the intermediary hop node replaces the value in the BDP with the measured current value at step 425. Otherwise, it does not modify the packet payload ("N" at step 420). In either case, it then transmits the BDP 50 to the next hop node at step 430. The next hop node is determined based upon the routing protocol for the black network 30 (or red network if no black network 30).

Additionally, the intermediary hop nodes store the measured forward link bandwidth or the value from the BDP 50 in the storage device and records in the storage device an indication of the fact that it transmitted the BDP 50 with this value pertaining to the specified Ea→Eb multi-hop path at step 435.

Additionally, the intermediary nodes, e.g., N2-Nm−1, relay(s) the probe pair 10 in the forward direction towards the destination, e.g., Eb (or Rb), step 440. The probe pair 10 is relayed using the routing protocol for the black network 30 (or red network if no black network 30).

The intermediary nodes, e.g., N2-Nm−1, can also periodically monitor the bandwidth after transmitting the BDP 50 for the specific multi-hop path. The period can be adjusted based upon a schedule, total load on the network, etc. The period is tracked using a clock. The clock can be internal to the processor. Alternatively, an external timer can be used. At decision step 445, the intermediary nodes, e.g., N2-Nm−1, determine(s) if it is time to measure the forward link bandwidth. If not, ("N" at step 445), the intermediary nodes, e.g., N2-Nm−1, remain(s) in standby. For purposes of the description, standby refers to not performing the described functionality for the specific probe pair 10 which triggered the process, however, the nodes can be performing other network functions or processing other probe pairs for a different multi-hop path. If it is time ("Y" at step 445), the intermediary nodes, e.g., N2-Nm−1, measure(s) the forward link bandwidth at step 450 in a similar manner as step 415. If the bandwidth changed in a way that would have changed the decision to replaced value of the bandwidth in the BDP 50, it will generate a new BDP. At decision step 455, the intermediary nodes, e.g., N2-Nm−1, determine(s) a difference between the current measured bandwidth and the previously recorded bandwidth (the recorded bandwidth equals the bandwidth in the previous BDP). If the difference is less than a threshold, then it would not have changed replacement decision, thus the intermediary nodes, e.g., N2-Nm−1, returns to standby, e.g., process returns to step 445. If the difference is greater than the threshold, the intermediary nodes, e.g., N2-Nm−1, creates a new BDP 50 at step 460. BDP 50 includes the current bandwidth. The intermediary hop node does not set the flag. Therefore, the recipient of the new BDP 50 will know that the packet was not created by the first hop node. The new BDP 50 is sent to the next hop, e.g., N3, on the Ea→Eb multi-hop path as opposed to the destination Eb.

The periodic monitoring and measurement of the bandwidth after transmitting or forwarding the BDP 50 is optional. The periodic monitoring and measuring reduces the latency in Ra's discovering that the bottleneck bandwidth for the specified multi-hop path has changed, because the node that becomes aware of the bandwidth change does not have to wait for Ra to send another probe pair 10 and N1 to send a new BDP 50 to report the change. On the other hand, this reporting function requires that the node maintains information concerning the bandwidth that it reported on each active path and status information. If removed, the recording steps are also removed.

If the receiving node is the last-hop node on the specified multi-hop path to Eb (which is Nm in FIG. 2) (hereinafter "Nm"), ("Y" at step 405), the BDP's payload value is the bottleneck bandwidth on the specified multi-hop path from Ea to Eb (or Ra to Rb if no black network 30).

Nm records this value as well as the source and destination addresses of the specified multi-hop path endpoints, e.g., Ea and Eb (or Ra and Rb if no black network 30) and discards the BDP at step 500. Since, the first hop node and intermediary nodes measure the current bandwidth and replace the bandwidth in the packet as described above, the bandwidth in the BDP 50 when the BDP 50 reaches the Nm is the smallest link bandwidth encountered on the specified multi-hop path.

When Nm receives a probe pair 10 transmitted from Ea to Eb (relayed by the nodes in the multi-hop path), it delays the two probes, e.g., Packet 1 and packet 2, to create a probe gap corresponding to the bandwidth stored in the storage device. Nm adjusts T2-T1, from equation 1 to produce the correct bandwidth given the length of the second probe L2.

$B = L2/(T2-T1)$, where B is the bottleneck bandwidth, L2 is the length of the second probe in bits, and T1 and T2 are the arrival times of the first and second probes, respectively.

Nm relays the probe pair 10 with adjusted delay to Eb (or to Rb if no black network 30) at step 510. When the probe pair 10 crosses the black/red boundary (at Eb) and are received by Rb, Rb will be able to infer the correct bandwidth.

FIG. 4 illustrates a flow chart for the handling of BDPs 50 that are not created by the first hop node or BDP 50 that are not the first BDP in the cycle. When a node (any intermediary node), e.g., N2-Nm−1, receives a bandwidth discovery packet whose flag indicates that the packet was originated by a node other than the first hop, Ni retrieves the recorded bandwidth at step 600. Ni determines if the packet's bandwidth value would have changed the replacement decision for the last time that it forwarded a BDP 50. The node compares the value in the BDP with the stored value at decision step 605. If the recorded value is greater than the value in the BDP ("N" in step 605), the node forwards the packet to the next hop at step 610. If not ("Y" at step 605), it should discard the packet without forwarding the BDP 50 at step 615.

When Nm receives the new BDP, it records the new value and waits until a new probe packet 10 is received. Similarly, if the first hop node creates a new BDP 50 for the same probe pair cycle and for the same source and destination, each intermediary node performs steps 600-615. When Nm receives the new BDP, it records the new value and waits until a new probe packet 10 is received.

FIG. 5 illustrates a flow chart for steps performed by the host Eb. At step 700, the host Eb receives the probe pair 10 (adjusted). The host Eb determines the delay between the probe pair, i.e., T2 and T1 at step 705. Using equation 1, the host Eb determines the bottleneck bandwidth at step 710. At step 715, Rb sends a message 20 back to Ra with the bandwidth that Rb has determined.

Step 715 can be removed if bandwidth is symmetric. Ra and Rb know that the bandwidth is the same in both directions, in which case the two hosts 1 can infer the bandwidth in both directions based on the unidirectional measurement.

The above identified method can be used in networks that do not have red/black boundaries. For example, Ra could send a bandwidth discovery packet to Rb, and each node along the path would treat the packet as described above. If no red/black boundary, there is no need to have probe pair 10; the individual nodes can periodically transmit the BDP 50.

Figure 6:
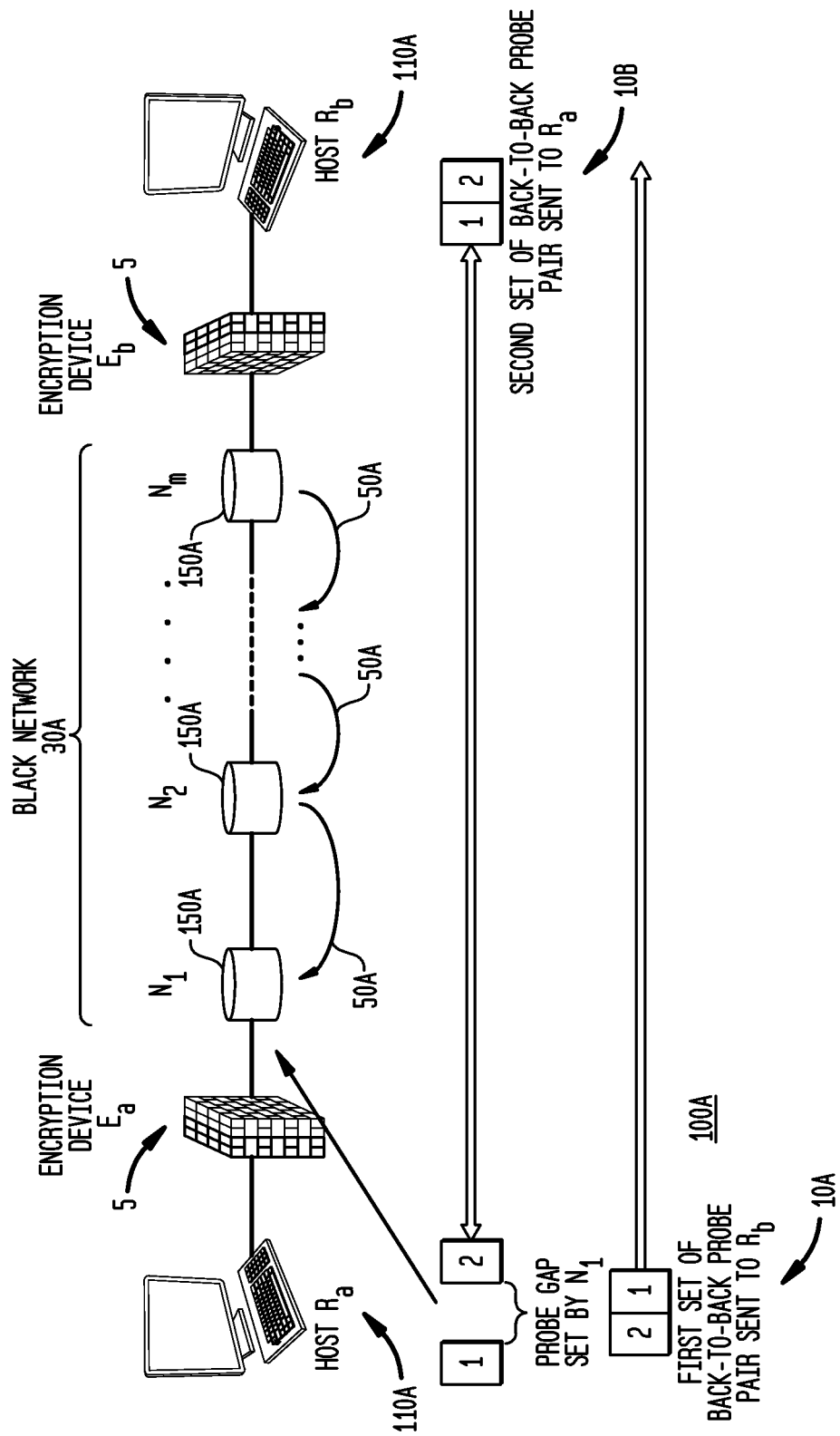
FIG. 6 illustrates a diagram of another exemplary system for estimating a bottleneck bandwidth in accordance with the invention.
Figure 7:
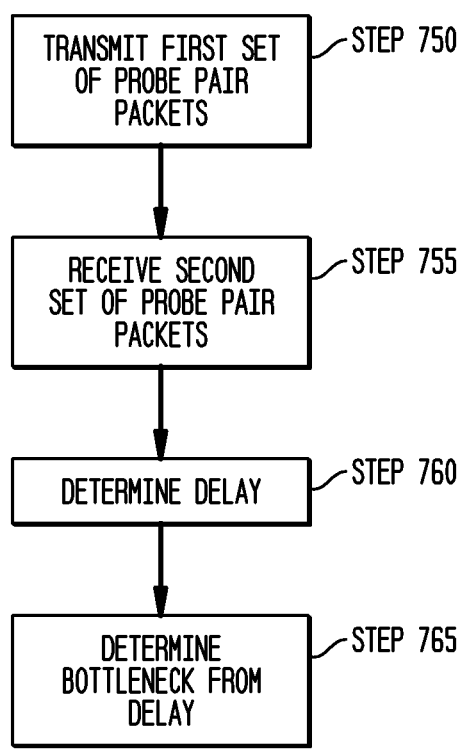
FIGS. 7-10 illustrate flow charts for an exemplary method of estimating the bottleneck bandwidth for a specific multi-hop path from Ra to Rb in accordance with the invention for the system depicted in FIG. 6.
Figure 8:
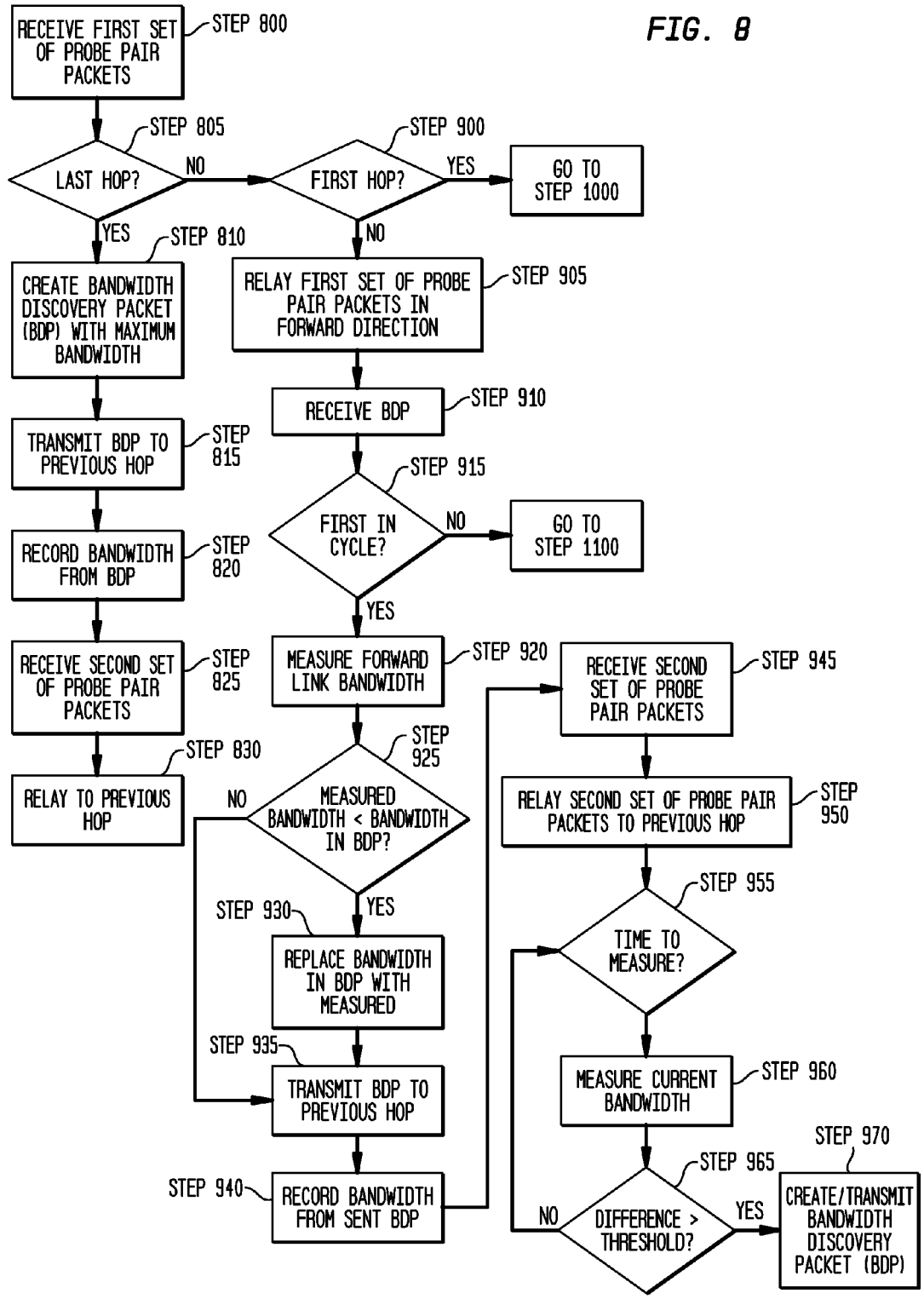

FIG. 6 illustrates a second system 100A for estimating a bottleneck bandwidth in accordance with the invention. The system 100A also uses both probe pairs (10A and 10B) and bandwidth discovery packets 50A ("BDPs") to estimate the bottleneck bandwidth. The system 100A is similar to system 100 except that the system 100A transmits probe pairs from both hosts (collectively referenced as "110A" and individually references as Ra or Rb) (in the forward and reverse direction) and the bandwidth discovery packet 50A is transmitted in the reverse direction. Additionally, instead of the last hop node, Nm adjusting the gap in the probe pair, the first hop node, adjusts the gap. Since the systems are similar, the similarities will not be described in detail again.

Host Ra transmits a first probe pair 10A (back-to-back) in the forward direction. Host Rb transmits a second probe pair 10B in the reverse direction. The first probe pair 10A is transmitted for a specified multi-hop path. The first probe pair (packets) 10A is relayed to Host Rb. The first probe pair 10A triggers the last hop node in the forward direction (e.g., from Ra to Rb) to generate a bandwidth discovery packet BDP 50A. The BDP 50A is transmitted in the reverse direction, e.g., towards Ra. The BDP 50A is transmitted from the last hop node Nm to its previous hop node. The previous hop node is the node that directly sent the first probe pair 10A to the last hop node. The BDP 50A is relayed through all of the nodes of the specified multi-hop path to the first hop node, e.g., N1. The nodes of the specified multi-hop path are the nodes that relay the first probe pair 10A for a specified multi-hop path. At each node of the multi-hop path, the node measures the bandwidth on the forward link as described above for the system 100. When the first hop node, e.g., N1 receives the BDP 50A, it removes the bandwidth from the BDP 50A and stores this value in the storage device. The second probe pair 10B is also transmitted for the same specified multi-path. Subsequently, when the first hop node, e.g., N1, receives the second probe pair 10B, it adjusts the delay between the packets in the second probe pair and relays the adjusted second probe pair 10B to the host Ra. The host Ra estimates the bottleneck bandwidth from the gap or delay in the adjusted second probe pair 10B.

FIGS. 7-10 illustrate flow charts for an exemplary method of estimating the bottleneck bandwidth for a specific multi-hop path from Ra to Rb in accordance with the invention using two sets of probe pairs 10A and 10B as illustrated in FIG. 6.

At step 750, Ra transmits the first probe pair 10A. The first probe pair 10A includes a specified multi-hop path, i.e., source to destination. The source is Ra and the destination is Rb. If there is a black network 30A, the encryption devices 5 encrypt the first probe pair 10A. The packets appear as if the source is Ea and the destination is Eb.

At step 800, the first probe pair 10A is received by a node 150A. At decision step 805, the node 150A determines if it is the last hop node on the specified multi-hop path, e.g., Nm (hereinafter the last hop node is referenced as "Nm"). The last hop is the node having a direct link with the destination, e.g., link with either Eb or Rb (if no black network 30A).

If the node 150A is the Nm, the node 150A generates a BDP 50A at step 810. This packet's payload contains the network addresses of the originating and terminating encryption devices, e.g., endpoints, Ea and Eb (or Ra and Rb if no black network, the network address, or other unique identifier, of the node creating the BDP 50A (which in this case is Nm), a flag to indicate whether the node creating the BDP 50A is the last hop node on the specified multi-hop path (which is true in this case) and the highest possible value of bandwidth recordable within the packet.

Nm sends the BDP 50A to the previous hop on the Ea→Eb path at step 815. The previous hop is the node that forwarded the first probe pair 10A to Nm. This can be identified either through via routing tables, link-layer information that Nm has, and/or the use of inverse address resolution protocol (ARP). The previous hop is not necessarily the next hop on the Eb→Ea path, because of possible route asymmetry. To send the packet to Node Nm−1, Node Nm addresses the packet to node Nm−1, not to Ea. This forces the BDP 50A to go to the previous hop on the Ea→Eb path.

Nm also records the measured bandwidth value in its storage device for later use at step 820. Additionally, Nm notes in the storage device that it has already sent a BDP 50A. At step 825, Nm receives the second probe pair 10B. Nm relays the second probe pair 10B in the forward direction towards the destination, e.g., Ea (or Ra), step 830, e.g., to the previous hop node that it sent the BDP 50A.

If the node 150A is not the Nm, ("N" at step 805), the node 150A determines if it is the first hop node, e.g., N1 (hereinafter the first hop node is referenced as "N1") at step 900. If the node 150A is not the N1, then it relays the first probe pair 10A in the forward direction towards the destination at step 905 (to the next hop node, e.g., N2-Nm). The relay node is selected based upon the network routing protocol. For example, the node 150A can examine a local routing table.

After forwarding the first probe pair 10A, the node 150A waits for either a BDP 50A or the second probe pair 10B. When the BDP 50A is received (step 910), the node (intermediary hop node) determines if the BDP 50A is the first for the cycle at decision step 915. The node, e.g., N2, determines if the node 150A has already processed a BDP 50A for the specified multi-hop path. This determination is based upon both the flag in the BDP 50A and if an indication has been stored in the storage section. If the BDP 50A was not created by the Nm (last hop node) the flag is not set. If the flag is not set, the node, e.g., N2 will proceed to step 1100. Additionally, if the node has already processed a BDP 50A for this cycle ("N" at step 915) the node will proceed to step 1100. Probe pairs 10A and 10B are periodically sent for the same multi-path. The cycle refers to the same probe pair 10A that triggered Nm to send the specific BDP 50A. Optionally, the BDP 50A can include a cycle count or a timestamp. The cycle can be determined directly from the cycle count. Additionally, the cycle can be deduced by the current time and the time stamp. If the current time exceeds a predetermined time from the time stamp, the node can deduce that it is a new BDP 50A.

If the intermediary hop node has not processed a BDP 50A for the specified multi-hop path, the intermediary hop node (s), e.g., N2-Nm−1, measures the current forward link bandwidth at step 920. And compare(s) the bandwidth value in the BDP 50A with the bandwidth that it has measured from itself to its next hop. At decision step 925, the measured current forward link bandwidth is compared with the bandwidth from the BDP 50A. If the former value is lower than the latter ("Y" at step 925), the intermediary hop node replaces the value in the BDP 50A with the measured current value at step 930. Otherwise, it does not modify the packet payload ("N" at step 925). In either case, it then transmits the BDP 50A to the previous hop node at step 935. The previous hop node is the node that transmits the first probe pair 10A to the node 150A. To send the BDP 50A to node Ni, Node Ni+1 addresses the packet to Node Ni. Node Ni is determined in the same manner has described above.

Additionally, the intermediary hop nodes store the measured forward link bandwidth or the value from the BDP 50A in the storage device and records in the storage device an indication of the fact that it transmitted the BDP 50A with this value pertaining to the specified Ea→Eb multi-hop path at step 940.

Additionally, the intermediary nodes, e.g., N2-Nm−1, when the intermediary nodes receive the second probe pair 10B (step 945), the node relay(s) the second probe pair 10B in the forward direction towards the destination, e.g., Ea (or Ra), at step 950. The intermediary nodes are determined by the underlying routing protocol. The intermediary nodes between Ea to Eb and Eb to Ea may be different.

The intermediary nodes, e.g., N2-Nm−1, can also periodically monitor the bandwidth after transmitting the BDP 50A for the specified multi-hop path. The period can be adjusted based upon a schedule, total load on the network, etc. The period is tracked using a clock. The clock can be internal to the processor. Alternatively, an external timer can be used. At decision step 955, the intermediary nodes, e.g., N2-Nm−1, determine(s) if it is time to measure the forward link bandwidth. If not, ("N" at step 955), the intermediary nodes, e.g., N2-Nm−1, remain(s) in standby. For purposes of the description, standby refers to not performing the described functionality for the specific probe pair 10 which triggered the process, however, the nodes 150A can be performing other network functions or processing other first and second probe pairs 10A and 10B for a different multi-hop path. If it is time ("Y" at step 955), the intermediary nodes, e.g., N2-Nm−1, measure(s) the forward link bandwidth at step 960 in a similar manner as step 920. If the bandwidth changed in a way that would have changed the decision to replace the value of the bandwidth in the BDP 50A, it will generate a new BDP 50A. At decision step 965, the intermediary nodes, e.g., N2-Nm−1, determine(s) if the difference between the current measured bandwidth and the previous recorded bandwidth (the recorded bandwidth equals the bandwidth in the previous BDP 50A) is greater than a predetermined threshold. The predetermined threshold is based upon the need to quickly reflect the current bandwidth at each hop. However, the threshold is set high enough not to continually generate new BDP 50A. If the comparison indicates that the measured bandwidth did not significantly change from the recorded bandwidth ("N" at step 965), i.e., difference less than the threshold, the intermediary nodes, e.g., N2-Nm−1, returns to standby, e.g., process returns to step 955. If the comparison indicates that the measured bandwidth significantly changed from the recorded bandwidth, the intermediary nodes, e.g., N2-Nm−1, creates a new BDP 50A at step 970. BDP 50A includes the current bandwidth. The intermediary hop node does not set the flag. Therefore, the recipient of the new BDP 50A will know that the packet was not created by the last hop node (Nm). The new BDP 50A is sent to the previous hop, e.g., N3, on the Ea→Eb multi-hop path. The previous hop node is the node 150A the transmitted the first probe pair 10A to the sending node.

Steps 955-970 are also performed by the last hop node (Nm).

Figure 9:
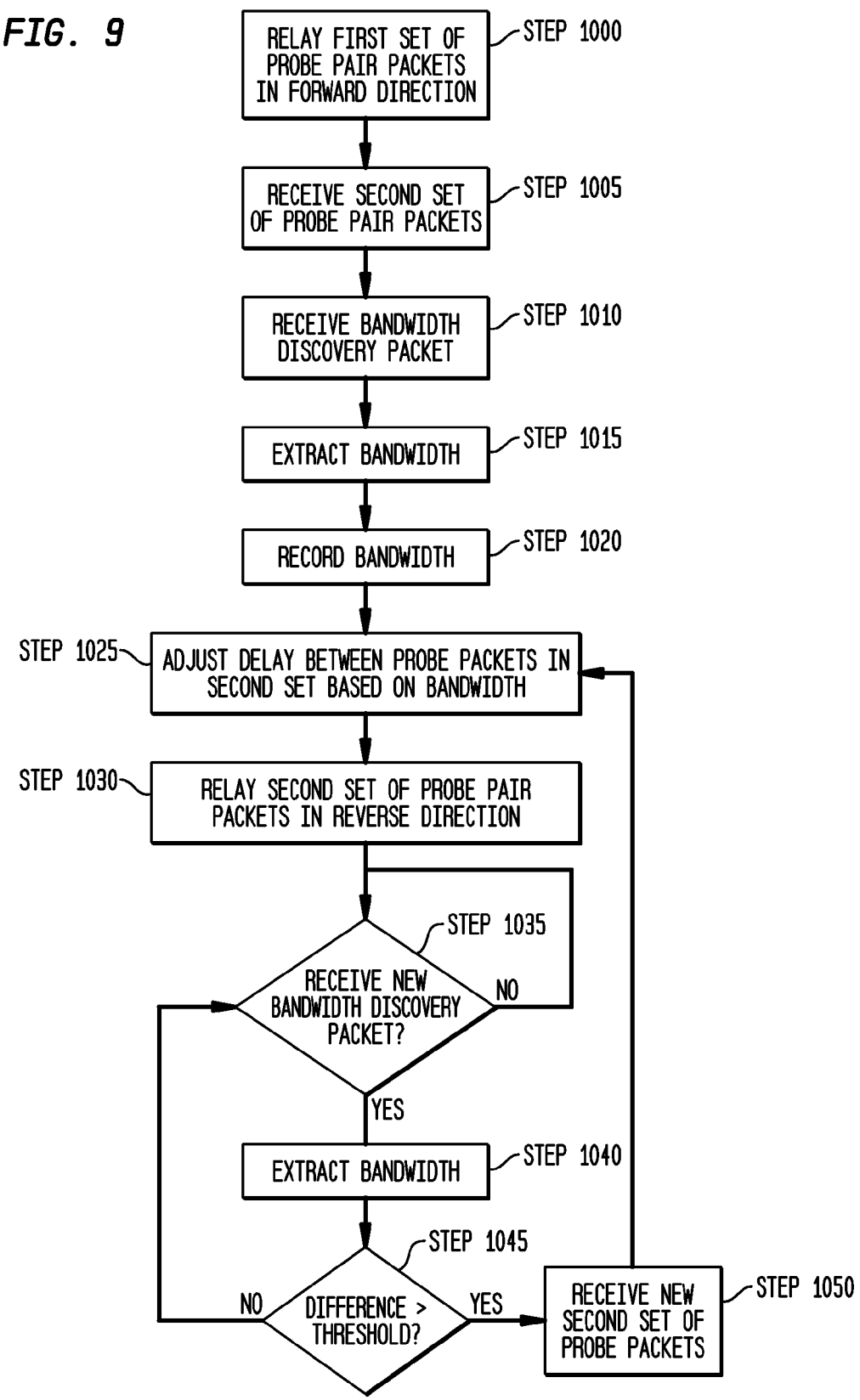

FIG. 9 illustrates a flow chart for N1 (the first hop node). When the first set of probe packets are received, N1 relay the packets to the next hop node in the multi-hop path at step 1000. The next hop node is determined using the routing protocol for the network, i.e., black network 30B routing protocol or the next cycle of the probe pair 10A for the current path.

Afterwards, N1 waits for either the second probe pair 10B or the BDP 50A (or another set of probes for a different path).

At steps 1005 and 1010, N1 receives the second probe pair 10B and the BDP 50A, respectively. Although FIG. 9 depicts the second probe pair 10B being received prior to the BDP 50A, the order can change. At step 1015, N1 extracts the bandwidth from the BDP 50A. The bandwidth discovery packet's payload value is the bottleneck bandwidth on the path from Ea to Eb. N1 records this value along with the source and destination address for the multi-hop path, e.g., Ea and Eb, and discards the packet at step 1020. The packet payload value when the BDP 50A arrives at N1 is the smallest link bandwidth encountered on the Ea→Eb path.

At step 1025, N1 adjusts the delay in the packets of the second probe pair 10B to create a probe gap corresponding to the bandwidth recorded. In other words, it causes T2-T1 in the equation for the bandwidth estimate to allow Ra to infer the correct bandwidth on the Ea→Eb path. N1 relays the second probe pair 10B with adjusted delay to Ea (or to Ra if no black network 30A) at step 1030. When the second probe pair 10B crosses the black/red boundary (at Ea) and are received by Ra, Ra will be able to infer the correct bandwidth.

When a new BDP 50A is received by N1 for the same first probe pair 10A ("Y" at step 1035), N1 determines if the bandwidth in the BDP 50A has changed significantly. N1 extracts the bandwidth from the BDP 50A at step 1040. If there is a significant change ("Y" at step 1045), when the new second set of probe packets 10B are received (step 1050), N1 adjusts the delay again to account for the current bandwidth (step 1025). If the change is less than a threshold, the gap is unadjusted. If a new BDP 50A is not received by N1, the node remains in a standby mode.

Figure 10:
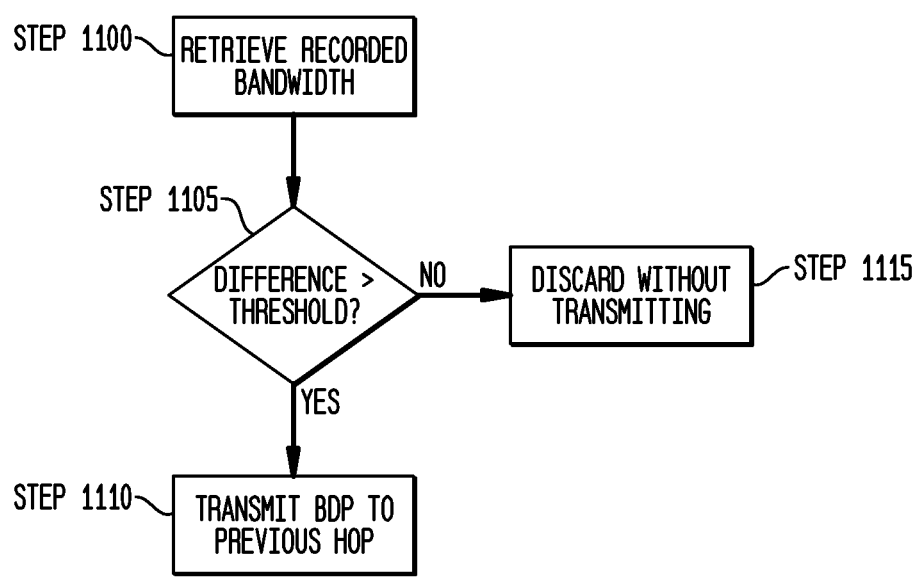

FIG. 10 illustrates a flow chart for the handling of BDPs 50A that are not created by the last hop node or BDP 50A that are not the first BDPA in the cycle. When a node (any intermediary node), e.g., N2-Nm−1, receives a bandwidth discovery packet whose flag indicates that the packet was originated by a node other than the last hop node, N1 retrieves the recorded bandwidth at step 1100. N1 determines if the packet's bandwidth value would have changed the replacement decision for the last time that it forwarded a BDP 50A. The node compares the value in the BDP with the stored value at decision step 1105. If the difference between the recorded value and the bandwidth in the BDP 50A is greater than a threshold ("Y" in step 1105), the node forwards the packet to the previous hop node at step 1110. If not ("N" at step 1105), it discards the packet without forwarding the BDP 50A at step 1115. When N1 receives the new BDP, it records the new value if the change is significant, i.e., greater than a predetermined threshold and waits until a new probe packet 10B is received.

When the host Ra receives the second probe pair 10B (adjusted) (step 755). The host Ea determines the delay between the packets in the second probe pair, i.e., T2 and T1 at step 760. Using equation 1, the host Ea determines the bottleneck bandwidth at step 765.

As will be appreciated by one skilled in the art, the present invention may be embodied as a system, device(s), method or computer program product. Accordingly, the present invention may take the foam of an entirely hardware embodiment, an entirely software embodiment (including firmware, resident software, micro-code, etc.) or an embodiment combining software and hardware aspects that may all generally be referred to herein as a "router", "node" or "system."

Various aspects of the present invention may be embodied as a program, software, or computer instructions embodied or stored in a computer or machine usable or readable medium, which causes the computer or machine to perform the steps of the method when executed on the computer, processor, and/or machine. A computer readable medium, tangibly embodying a program of instructions executable by the machine to perform various functionalities and methods described in the present invention is also provided.

The devices, nodes, routers, systems, methods and programs of the present invention may be implemented and run on a general-purpose computer or special-purpose computer system. The computer system may be any type of known or will be known systems such as, but not limited to, a virtual computer system and may typically include a processor, memory device, a storage device, input/output devices, internal buses, and/or a communications interface for communicating with other computer systems in conjunction with communication hardware and software, etc.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "devices", "nodes", "routers", "server" and "network" as may be used in the present invention may include a variety of combinations of fixed and/or portable computer hardware, software, peripherals, and storage devices. The system may include a plurality of individual components that are networked or otherwise linked to perform collaboratively, or may include one or more stand-alone components. The hardware and software components of the computer system of the present application may include and may be included within fixed and portable devices such as desktop, laptop, and/or server, and network of servers (cloud).

The above description provides illustrative examples and it should not be construed that the present invention is limited to these particular example. Thus, various changes and modifications may be effected by one skilled in the art without departing from the spirit or scope of the invention as defined in the appended claims.

What is claimed is:

1. A method for determining a bottleneck bandwidth on a multi-hop path between a first and a second encrypted network endpoint comprising:
   receiving probe packets from a source node by a first hop node in the multi-hop path, the first hop node being determined by a routing protocol;
   measuring a bandwidth on a link between the first hop node and a next hop node in the multi-hop path, the next hop node being determined by the routing protocol;
   generating a bandwidth discovery packet including the measured bandwidth;
   transmitting the bandwidth discovery packet to the next hop node;
   relaying the probe packets to the next hop node; and
   determining if the next hop node is a last-hop node on the multi-hop path based upon the routing protocol,
   wherein if the next hop node is the last hop node, the method further comprises:
   recording the measured bandwidth from the bandwidth discovery packet;
   adjusting the delay between the probe packets based upon the measured bandwidth from the bandwidth discovery packet; and
   relaying the probe packets to the destination node.

2. The method for determining a bottleneck bandwidth on a multi-hop path between a source node and a destination node according to claim 1, wherein the destination node determines the bottleneck bandwidth based on the delay between the probe packets.

3. The method for determining a bottleneck bandwidth on a multi-hop path between a source node and a destination node according to claim 1, further comprising:
   setting a flag, by the first hop node, indicating that the first hop node generated the bandwidth discovery packet.

4. The method for determining a bottleneck bandwidth on a multi-hop path between a source node and a destination node according to claim 3, wherein the bandwidth discovery packet includes an identifier of the source node and destination node, an identifier of the first hop node, and the flag in addition to the measured bandwidth.

5. The method for determining a bottleneck bandwidth on a multi-hop path between a source node and a destination node according to claim 1, wherein
if the next hop node is not the last hop node, the method further comprises:
measuring a bandwidth on a link between the next hop node and a hop node along the multi-hop path that is its next hop node, the hop node being determined by the routing protocol;
comparing the measured bandwidth on the link between the next hop node and its next hop node with the measured bandwidth from the bandwidth discovery packet;
modifying the measured bandwidth from the bandwidth discovery packet based upon the comparing;
transmitting the bandwidth discovery packet to its next hop node;
relaying the probe packets; and
recording either the modified the measured bandwidth from the bandwidth discovery packet or an unmodified measured bandwidth from the bandwidth discovery packet as a recorded bandwidth.

6. The method for determining a bottleneck bandwidth on a multi-hop path between a source node and a destination node according to claim 5, wherein if the measured bandwidth on the link between the next hop node and its next hop node is less than the measured bandwidth from the bandwidth discovery packet, the next-hop node modifies the measured bandwidth from the bandwidth discovery packet by replacing it with the measured bandwidth on the link.

7. The method for determining a bottleneck bandwidth on a multi-hop path between a source node and a destination node according to claim 5, wherein each node in the multi-hop path that is not the last hop node or the first hop node measures a bandwidth on a link between each node and its next hop node in the multi-hop path, compares the measured bandwidth on the link with the measured bandwidth from the bandwidth discovery packet, modifies the measured bandwidth from the bandwidth discovery packet based upon the comparing, transmits the bandwidth discovery packet to its next hop node, relaying the probe packets to the destination node, and records either the modified the measured bandwidth from the bandwidth discovery packet or an unmodified measured bandwidth from the bandwidth discovery packet, where each node and its next hop node is determined by the routing protocol.

8. The method for determining a bottleneck bandwidth on a multi-hop path between a source node and a destination node according to claim 7, wherein after transmitting the bandwidth discovery packet for the multi-hop path, the method further comprises:
measuring a current bandwidth on the link between a node measuring the bandwidth and its next hop node;
comparing the measured current bandwidth with the recorded bandwidth;
generating new bandwidth discovery packet including the current bandwidth as a bandwidth in the new bandwidth discovery packet if a difference between the current bandwidth and the recorded bandwidth is greater than a predetermined threshold, wherein if the node that measured the bandwidth is not the first hop node in the multi-hop path, a flag is not set, the flag indicating that the first hop node generated the bandwidth discovery packet; and
transmitting the new bandwidth discovery packet to its next hop node, wherein the new bandwidth discovery packet is relayed to the last hop node using nodes in the multi-hop path.

9. The method for determining a bottleneck bandwidth on a multi-hop path between a source node and a destination node according to claim 8, wherein when the next hop node receives the new bandwidth discovery packet, the next hop node compares the recorded value with the bandwidth in the new bandwidth discovery packet and relays the new bandwidth discovery packet based upon the comparison.

10. The method for determining a bottleneck bandwidth on a multi-hop path between a source node and a destination node according to claim 2, wherein the destination node sends the determined bottleneck bandwidth to the source node.

11. The method for determining a bottleneck bandwidth on a multi-hop path between a source node and a destination node according to claim 1, wherein nodes on the multi-hop path are in a secure encrypted network.

12. The method for determining a bottleneck bandwidth on a multi-hop path between a source node and a destination node according to claim 11, wherein probe packets are encrypted and a source identifier and destination identifier of encryption end points are added to a packet header as a source and destination address.

13. The method for determining a bottleneck bandwidth on a multi-hop path between a source node and a destination node according to claim 11, wherein the source node and destination node are in a unencrypted network, the source node being a first host and the destination node being a second host.

14. A router comprising:
a storage device configured to store a computer program;
a communication section; and
a processor for executing the computer program stored in the storage device,
wherein, when the router receives probe packets from a node whose address is the same as a source address in the probe packets, the probe packets having a destination of a destination node, the processor is configured to measure a bandwidth on a link between the router and another router which is a next hop router in a multi-hop path to the destination node, the next hop router being determined by the routing protocol, generate a bandwidth discovery packet including the measured bandwidth, and transmit the bandwidth discovery packet to the next hop router and relaying the probe packets to the next hop router;
wherein when router receives probe packets from another router and the bandwidth discovery packet, the processor is configured to determine if the router is a last-hop router on the multi-hop path to the destination node based upon the routing protocol, wherein if the router is not the last-hop router, the processor is configured measure a bandwidth on a link between the router and another router which is a next hop router in the multi-hop path to the destination node, the next hop router being determined by the routing protocol, compare the measured bandwidth on the link between the router and the next hop router with the measured bandwidth from the bandwidth discovery packet, modify the measured bandwidth from the bandwidth discovery packet based upon the comparing, transmit the bandwidth discovery packet to the next hop router, relay the probe packets and record either the modified the measured bandwidth from the bandwidth discovery packet or an unmodified measured bandwidth from the bandwidth discovery packet as a recorded bandwidth; and wherein when router receives probe packets from another router and the bandwidth discovery packet, the processor, is configured to determine if the router is a last-hop router on the multi-hop path to the destination node based upon the routing protocol, wherein if the router is the last-hop router, the processor is configured to record the measured bandwidth from the bandwidth discovery packet in the storage device, adjust the delay between the probe packets based upon the measured bandwidth from the bandwidth discovery packet and relay the probe packets to the destination node.

15. The router of claim 14, wherein after transmitting the bandwidth discovery packet for the multi-hop path, the processor is configured to periodically measure a current bandwidth on the link between the router and another router which is the next hop router, compare the measured current bandwidth with the recorded bandwidth in the storage device, generate a new bandwidth discovery packet including the current bandwidth as a bandwidth in the new bandwidth discovery packet if a difference between the current bandwidth and the recorded bandwidth is greater than a predetermined threshold, wherein if the router is not a first hop router in the multi-hop, the processor is configured not to set a flag, the flag indicating that the first hop router generated the bandwidth discovery packet and the processor is further configured to transmit the new bandwidth discovery packet to a next hop router.

16. The router of claim 15, wherein when the router receives the new bandwidth discovery packet, the processor is configured to compare the recorded value with the bandwidth in the new bandwidth discovery packet and relay the new bandwidth discovery packet based upon the comparison.

17. A method for determining a bottleneck bandwidth on a multi-hop path between a first and a second encrypted network endpoint comprising:

receiving a first set of probe packets from a first host node by a last hop node in the multi-hop path, the last hop node being determined by a routing protocol, the first set of probe packets being relayed via the multi-hop path to the last hop node, the first set of probe packets being encrypted by the first encrypted network endpoint;

receiving a second set of probe packets from a second host node by the last hop node, the second set of probe packets being encrypted by the second encrypted network endpoint, generating a bandwidth discovery packet including a maximum recordable bandwidth at a last hop node in a multi-hop path between the first and the second encrypted network endpoints;

transmitting the bandwidth discovery packet to previous hop node, the previous hop node being a node within the multi-hop path that directly transmitted the first set of probe packets to the last hop node;

relaying the second set of probe packets to the previous hop node;

determining if the previous hop node is a first hop node on the multi-hop path based upon the routing protocol, wherein if the previous hop node is the first hop node, the method further comprises:

recording the bandwidth from the bandwidth discovery packet;

adjusting the delay between probe packets in the second set of probe packets based upon the bandwidth from the bandwidth discovery packet; and relaying the second set of probe packets to the first encrypted network endpoint, where the first encrypted network endpoint transmits the second set of probe packets to the first host node.

18. A method for determining a bottleneck bandwidth on a multi-hop path between a first and a second encrypted network endpoint according to claim 17, wherein the first host node determines the bottleneck bandwidth based upon the delay between probe packets in the second set of probe packets.

19. A method for determining a bottleneck bandwidth on a multi-hop path between a first and a second encrypted network endpoint according to claim 17, further comprising:

setting a flag, by the last hop node, indicating that the last hop node generated the bandwidth discovery packet and the identifier of the first and second encrypted network endpoints.

20. A method for determining a bottleneck bandwidth on a multi-hop path between a first and a second encrypted network endpoint according to claim 19, wherein the bandwidth discovery packet includes an identifier of the first and second encrypted network endpoints, an identifier of the last hop node, and the flag.

21. A method for determining a bottleneck bandwidth on a multi-hop path between a first and a second encrypted network endpoint according to claim 17, wherein if the previous hop node is not the first hop node, the method further comprises:

measuring a bandwidth on a link between the previous hop node and the last hop node in the multi-hop path;

comparing the measured bandwidth on the link between the previous hop node and last hop node with the bandwidth from the bandwidth discovery packet;

modifying the bandwidth from the bandwidth discovery packet based upon the comparing;

transmitting the bandwidth discovery packet to another node in the multi-hop node, the another node being a node which relayed the first set of probe packets to the previous hop node;

relaying the second set of probe packets to the another node;

and recording either the modified the bandwidth from the bandwidth discovery packet or an unmodified bandwidth from the bandwidth discovery packet as a recorded bandwidth.

22. A method for determining a bottleneck bandwidth on a multi-hop path between a first and a second encrypted network endpoint according to claim 21, wherein if the another node is not the first hop node, the bandwidth discovery packet is relayed to the first hop node using additional nodes that relayed the first set of probe packets to the last hop node, each additional node in the multi-hop path, measures a bandwidth on a link between the additional node and its next hop node in a forward direction on the multi-hop path between the first and second encrypted network endpoints:

compares the measured bandwidth on the link with the bandwidth from the bandwidth discovery packet;

modifies the bandwidth from the bandwidth discovery packet based upon the comparing;

transmits the bandwidth discovery packet to another additional node in the multi-hop node, the another additional node being a node which relayed the first set of probe packets to the additional node;

relays the second set of probe packets to the another additional node; and records either the modified the bandwidth from the bandwidth discovery packet or an unmodified bandwidth from the bandwidth discovery packet as a recorded bandwidth, wherein the another additional node becomes the additional node when it receives the bandwidth discovery packet or the first hop node.

23. A method for determining a bottleneck bandwidth on a multi-hop path between a first and a second encrypted network endpoint according to claim 22, wherein after transmitting the bandwidth discovery packet for the multi-hop path, the method further comprises:
  measuring a current bandwidth on the link between a node measuring the bandwidth and its next hop node in a forward direction on the multi-hop path between the first and second encrypted network endpoints;
  comparing the measured current bandwidth with the recorded bandwidth; generating new bandwidth discovery packet including the current bandwidth as a bandwidth in the new bandwidth discovery packet if a difference between the current bandwidth and the recorded bandwidth is greater than a predetermined threshold, wherein if the node that measured the bandwidth is not the last hop node in the multi-hop, a flag is not set, the flag indicating that the last hop node generated the bandwidth discovery packet; and
  transmitting the new bandwidth discovery packet to a node which relayed the first set of probe packets to the node measuring the bandwidth, the new bandwidth discovery packet is relayed to the first hop node using nodes in the multi-path between the first and second encrypted network endpoints.

24. A method for determining a bottleneck bandwidth on a multi-hop path between a first and a second encrypted network endpoint according to claim 23, wherein when the node receives the new bandwidth discovery packet, the node compares the recorded value with the bandwidth in the new bandwidth discovery packet and relays the new bandwidth discovery packet based upon the comparison.

* * * * *

UNITED STATES PATENT AND TRADEMARK OFFICE
CERTIFICATE OF CORRECTION

PATENT NO. : 8,787,190 B2  Page 1 of 1
APPLICATION NO. : 13/287376
DATED : July 22, 2014
INVENTOR(S) : Wagner et al.

It is certified that error appears in the above-identified patent and that said Letters Patent is hereby corrected as shown below:

In the Specification

After the Title and before the Field of Invention, Insert the following:

Column 1, Line 6: -- STATEMENT REGARDING FEDERALLY SPONSORED RESEARCH OR DEVELOPMENT The disclosed invention was made with government support under contract No. W15P7T-05-C-R402 awarded by Army Communications-Electronics Command (CECOM) and under contract No. FA8750-11-C-0254 awarded by Air Force Research Labs. The government has certain rights in the present invention. --

Signed and Sealed this
Eighteenth Day of November, 2014

Michelle K. Lee
*Deputy Director of the United States Patent and Trademark Office*